April 28, 1925.  
E. E. WEMP  
1,535,191  
METHOD OF CONSTRUCTING CLUTCH DISKS  
Filed Feb. 15, 1924  2 Sheets-Sheet 1
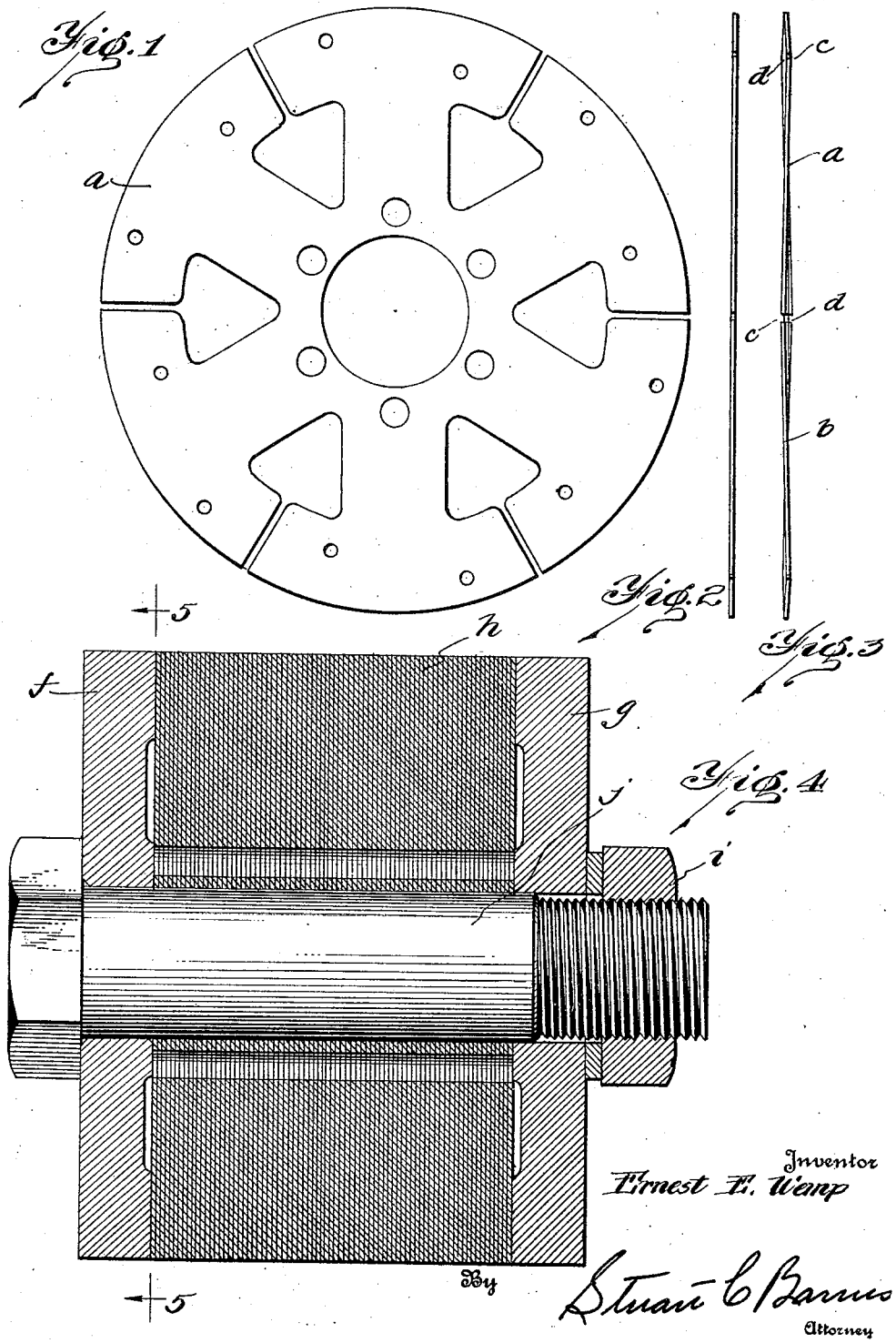

April 28, 1925.

E. E. WEMP

METHOD OF CONSTRUCTING CLUTCH DISKS

Filed Feb. 15, 1924     2 Sheets-Sheet 2

Inventor
Ernest E. Wemp

By Stuart C. Barnes
Attorney

Patented Apr. 28, 1925.

1,535,191

UNITED STATES PATENT OFFICE.

ERNEST E. WEMP, OF DETROIT, MICHIGAN.

METHOD OF CONSTRUCTING CLUTCH DISKS.

Application filed February 15, 1924. Serial No. 693,055.

*To all whom it may concern:*

Be it known that I, ERNEST E. WEMP, a citizen of the United States, residing at Detroit, in the county of Wayne and State of Michigan, have invented certain new and useful Improvements in Methods of Constructing Clutch Disks, of which the following is a specification.

This invention relates to the method of constructing clutch disks. In my co-pending application Serial No. 693,054, I have described and claimed a clutch disk of the "spoked" variety. Each of the spokes of the disk is twisted slightly on a radial axis. This is a permanent twist that must be given the spokes, yet the deformation and the metal must be of such a character that the portions may be twisted back to normal flat condition without injuring or fatiguing the metal.

In some of my prior applications, notably application Serial No. 470,851, I have described and claimed a spoked clutch disk which is intended to be perfectly flat. However, in actual practice it will be found that a great many of the disks after hardening are not accurately flat but are permanently distorted. Such a distortion is not desired.

It is the object of my present invention to afford a method of constructing and treating clutch disks which will not only permanently place deformations in the disk but also will eliminate deformations when these are undesirable.

In the appended drawings I have shown some of the disks and some of the features that are used in carrying out my method.

Fig. 1 is an elevation of a spoked disk such as employed in my clutch described in my prior application Serial No. 470,851.

Fig. 2 is an edge view of the same.

Fig. 3 is an edge view of a clutch disk having segments twisted on a radial axis, such as described and claimed in my co-pending application Serial No. 693,054.

Fig. 4 is a sectional view of the fixture for supporting the disks while they are undergoing the second heat treatment in my method.

Figure 5:
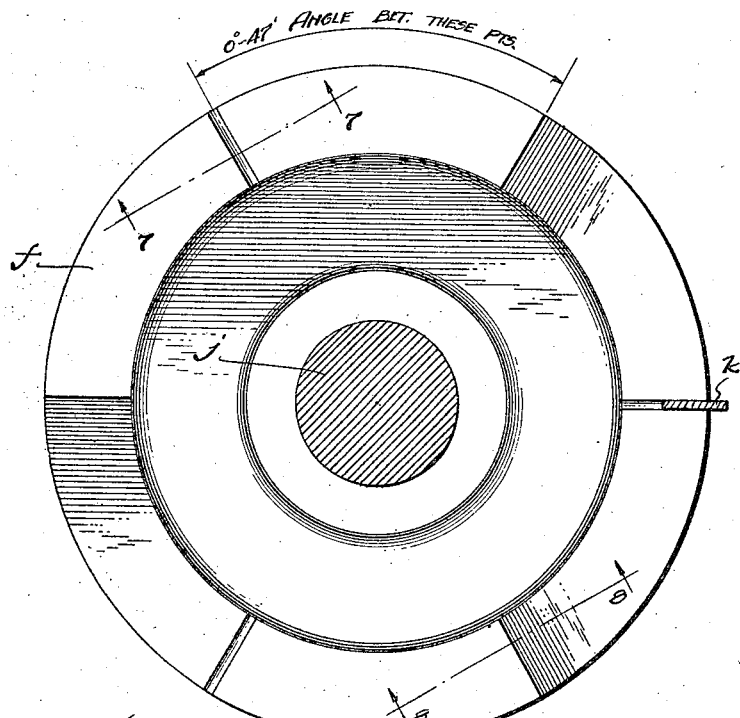
Fig. 5 is a plan view of one of the end plates of the fixture.
Figure 6:
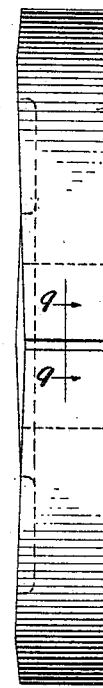
Fig. 6 is an edge elevation of the same.
Figure 7:
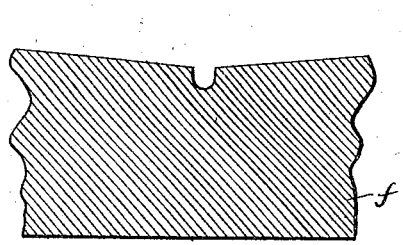
Figs. 7 and 8 are sections on the corresponding lines of Fig. 5.
Figure 8:
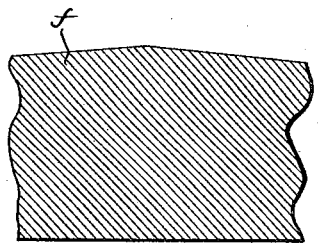

The spoked disk is blanked out and punched by suitable dies. This can be done in one or several operations. It is not necessary to describe or show these blanking and punching dies as such dies are common and well known in the art, and it is well within the skill of any good tool maker to design and make the dies necessary to punch out such a disk as is shown in Fig. 1.

The next operation is to place the disks in a furnace; an oil, gas, electric or other furnace may be used. Here the disks are heated up to a temperature of from 1450 to 1500 degrees Fahrenheit for a period of from 15 to 20 minutes. The disks are then taken out of the furnace and while red hot are separately quenched by dipping them edgewise into a vessel containing oil. This constitutes the hardening operation.

It will be found that a great many of the disks are not absolutely flat and that they present inequalities which give the disk a peak and valley effect. This is highly undesirable if the disk is designed to be perfectly flat, and the clutch parts are arranged to operate with a perfectly flat disk. It is therefore desirable to straighten the deformed portions. In another instance, such as described in my co-pending application Serial No. 693,054, it is desirable to give the disk a permanent deformation. For instance, the disk described in the pending application is intended to have alternate spokes twisted in opposite directions as is clearly shown in the edge view of Fig. 3, where the spoke *a* is twisted clockwise from a natural position, the spoke *b* twisted counter-clockwise from the natural position, forming a peak at the point *c* and a valley at the point *d*. Therefore, in order to give the disk a permanent deformation and still have it retain its spring or flexing character, I subject the disk to a further treatment.

In carrying out this further treatment, I subject them to strains of a constant nature during the heat treating operation now to be described. These strains are preferably the strains calculated to bring a deformed disk back to flat relation, or a flat or otherwise conditioned disk into a definite deformed relation. These strains can be practically imposed by means of a fixture comprising plates *f* and *g*. These I call the end plates of the fixture. These end plates, in case the disks are simply to be straightened out flat, have perfectly flat faces. However, where the disks are to be given a permanent definite deformation, these end plates have their inner faces properly shaped to accomplish this end. For instance, in order to get the twist effect on the disk shown in Fig. 3, the face of the fixture plate is divided into spoke segments and each segment is set at a slight angle, for example, 47'. This is a very slight twist and the twist in the face of the plate for each segment is in opposite directions for alternate faces. The plates are then packed in between the end plates in a stack designated *h*. This stack may hold, for instance, as high as 50 disks. These disks may some of them be flat and some of them deformed. They are, however, hardened and hence now are really made of spring metal so that they can be easily deformed temporarily. The bolt *j* is threaded through the center of the plates and the nut *i* screwed onto the end of the bolt. The bolt and nut are now drawn down as tightly as possible, this by reason of the spring character of the tempered disks and the angled faces of the end plates places the disks under a temporary distorting strain. We say temporary; the distorting strain of course will continue as long as the disks are held between the fixture plates, and still continue to bear their hardened condition. The next step is to subject them to a heat operation which releases this strain so that they will take a permanent set without, however, in any way impairing their temper. To this end I place the fixture with the stack of disks in a furnace and maintain the disks at a heat of 850 to 900 degrees Fahrenheit for two or three hours. The disks are then removed and cooled in air.

It will now be found that the disks have all been straightened and made perfectly flat if it is the object of the operation to flatten deformed disks, or on the other hand, if it is the object of the operation to give the disks a permanent definite deformation, it will be found that all the disks bear this specified deformation, yet they have all the temper and spring characteristics that is intended for a disk which is to be twisted and subjected to temporary deformations with the expectation of the disk resuming its normal condition when the stresses are removed.

I find that the heat treatment which I have described operates upon the fibre of the metal to release what I call the quenching strains during the heat treatment. Hence, when the disks are put in a furnace while under strain and then subjected to the heat operation the heat releases the strain under which the disks enter the furnace. After they have been removed from the furnace and allowed to be air cooled, it will be found that the disks have taken a permanent formation into the condition to which they were strained when put into the furnace. However, they still retain all their temper characteristics of instantly resuming this new condition when any subsequent deformation takes place.

Figure 9:
Fig. 9 is a section on the line 9—9 of Fig. 6.

When placing the disks between the fixtures *f* and *g*, it is necessary to so align the disks that the slots will be in alignment. This is accomplished by inserting a key *k* in keyway slots of the fixture members *f* and *g*. See Figs. 5 and 9. This key will enter one of the slots in the disks and thus correctly align the disks so that the segments will be correctly deformed.

What I claim is:

1. The method of treating clutch disks, which comprises the heating of such disks with a heat approximating from 1450 to 1500 degrees Fahrenheit, the quenching of the disks separately in oil, and then the arranging of the disks in stacks and subjecting them to strains calculated to deform them from their then present condition, then subjecting the same to a heating operation calculated to release such deforming strains, and allowing the disks to set in such deformed relation when the same cools.

2. The method of treating clutch disks, which comprises the subjecting of the same to a hardening operation and then stacking the disks in a fixture calculated to deform the disks from their then condition into a defined formation, the placing of the fixture containing such stack of disks in a furnace and heating the same so as to release the deforming strains so that the disks assume a defined formation as they cool.

In testimony whereof I have affixed my signature.

ERNEST E. WEMP.